United States Patent [19]

Thomas et al.

[11] Patent Number: 5,279,775
[45] Date of Patent: Jan. 18, 1994

[54] ACOUSTO-OPTICAL INTENSITY CONTROL OF LASER BEAM DURING ETCHING OF OPTICAL SERVO INFORMATION OF MAGNETIC MEDIA

[75] Inventors: Fred C. Thomas, Kaysville; Don W. Wallentine, Layton; James Bero, Ogden, all of Utah; Scott Wilson, Westminster, Colo.

[73] Assignee: Iomega Corporation, Roy, Utah

[21] Appl. No.: 896,196

[22] Filed: Jun. 10, 1992

[51] Int. Cl.5 .................. B23K 26/10; G11B 7/26; B29D 17/00
[52] U.S. Cl. ................... 264/1.3; 219/121.61; 219/121.69; 264/1.4; 264/25; 264/40.1
[58] Field of Search .................. 264/1.3, 1.4, 25, 106, 264/40.1; 219/121.6, 121.61, 121.62, 121.69

[56] References Cited

U.S. PATENT DOCUMENTS

| | | | |
|---|---|---|---|
| 3,875,024 | 4/1975 | Picquendar et al. | 264/106 |
| 4,410,968 | 10/1983 | Frobach et al. | 219/121.6 |
| 4,478,768 | 10/1984 | Takeoka | 264/106 |
| 4,633,451 | 12/1986 | Ahn et al. | 369/14 |
| 4,831,470 | 5/1989 | Brunnett et al. | 360/75 |
| 4,935,835 | 6/1990 | Godwin et al. | 360/135 |
| 4,961,123 | 10/1990 | Williams et al. | 360/131 |
| 5,045,669 | 9/1991 | Ortiz, Jr. et al. | 219/121.61 |
| 5,067,039 | 11/1991 | Godwin et al. | 360/135 |

FOREIGN PATENT DOCUMENTS

| | | | |
|---|---|---|---|
| 148411 | 12/1978 | Japan | 264/106 |
| 127987 | 4/1992 | Japan | 219/121.61 |

OTHER PUBLICATIONS

Y. Y. Fan and V. M. Huynh, "Investigation of Light Scattering From Rough Periodic Surfaces-Numbered Solutions", Dept. of Mech. Eng. Univ. of Windsor, Ontario, Mar. 1992.
J. Mazumder, "Overview of Melt Dynamics of Laser Processing", Optical Engin. vol. 30, No. 8, pp. 1208-1219 Aug. 1991.
M. W. Sasnett and T. F. Johnston, Jr., "Beam Characterization and Measurement of Propagation Attributes", Laser Beam Diagnostics, SPIE vol. 1414, Los Angeles 1991.
F. Jorgensen, "The Complete Handbook of Magnetic Recording" 3rd Edition, TAB Books, Inc., Blue Ridge Summit, Pa. 1988 pp. 119-121.
"An Introduction to the Insite 325 Floptical® Disk Drive", Godwin, Jr., *SPIE Optical Data Storage Topical Meeting*, vol. 1078, pp. 71-79, (1989).
"Optoelectronics—An Introduction", Wilson J., Hawkes, J. F. B., School of Physics, Newcastle upon Tyne Polytechnic, *Prentice Hall International*, pp. 110-117.

Primary Examiner—James Lowe
Attorney, Agent, or Firm—Woodcock Washburn Kurtz Mackiewicz & Norris

[57] ABSTRACT

The intensity of a beam of light used to etch concentric servo tracks on a magnetic medium is adjusted with an acousto-optical device to maintain a substantially constant energy density delivered by the beam while the optics which generate the beam move radially of the disk.

10 Claims, 4 Drawing Sheets

ACOUSTO-OPTICAL INTENSITY CONTROL OF LASER BEAM DURING ETCHING OF OPTICAL SERVO INFORMATION OF MAGNETIC MEDIA

FIELD OF THE INVENTION

This invention relates generally to etching optical servo tracks on magnetic disks and more particularly, to varying the intensity of an incident beam of light as the beam moves radially of a disk during etching of the optical servo tracks.

BACKGROUND OF THE INVENTION

So-called "floppy" disk memory systems for "desk top" sized computers are well known in the art. Such systems employ magnetic storage disks having a diameter of either 5.25 inches or 3.50 inches. Conventional magnetic storage disks for floppy disk drives have a track density ranging from forty-eight (48) to one hundred thirty-five (35) tracks per inch (TPI). In contrast, optical storage disks for optical memory systems achieve track densities greater than 15,000 TPI. The greater track density of optical disks is achieved by the use of optical servos that maintain fine positioning of the optical read/write head over the data tracks on the disk. Typically, concentric optical servo tracks are pre-recorded on the optical disk to guide the servo mechanism.

New advances in barium-ferrite magnetic media have allowed bit densities of magnetic storage disks to exceed the bit densities of optical disks. However, as mentioned above, track densities of magnetic media (48-135 TPI) are many times less than their optical counterparts. This limits the overall capacity of magnetic disks as compared to optical disks. Conventional magnetic disk systems employ a magnetic servo mechanism and magnetically prerecorded servo tracks on the disks to guide the read/write head. Magnetic servo systems cannot provide the fine positioning that optical servo systems can provide.

Recently, floppy disk systems have been developed that combine magnetic disk recording techniques with the high track capacity optical servos found in optical disk systems. Such a system is described in AN INTRODUCTION TO THE INSITE 325 FLOPTICAL(R) DISK DRIVE, Godwin, in a paper presented at the SPIE Optical Data Storage Topical Meeting (1989). Essentially, an optical servo pattern is prerecorded on a magnetic floppy disk. The optical servo pattern typically consists of a large number of equally spaced concentric tracks about the rotational axis of the disk. Data is stored in the magnetic "tracks" between the optical servo tracks using conventional magnetic recording techniques. An optical servo mechanism is provided to guide the magnetic read/write head accurately over the data between the optical servo tracks. By utilizing optical servo techniques, much higher track densities are achievable on the relatively inexpensive removable magnetic medium.

As mentioned, the optical servo pattern typically consists of a large number of equally spaced concentric tracks about the rotational axis of the disk. As disclosed in U.S. Pat. No. 4,961,123, each track may be a single continuous groove (FIG. 3), a plurality of equally spaced circular pits (FIG. 8), or a plurality of short equally spaced grooves or stitches (FIG. 9). Various methods and systems exist for inscribing the optical servo tracks on the magnetic medium.

For example, U.S. Pat. No. 5,067,039, entitled "High Track Density Magnetic Media with Pitted Optical Servo Tracks and Method for Stamping the Tracks on the Media," discloses a method for "stamping" the servo tracks on the magnetic medium. Essentially a master stamping disk is produced bearing a template of the optical servo pattern. This master disk is then pressed against the magnetic floppy disk under a pressure of several tons per square inch. The significant amount of pressure transfers the servo track pattern from the master disk to the floppy.

U.S. Pat. No. 4,633,451, entitled "Optical Servo for Magnetic Disks," discloses a method of providing optical servo information on a magnetic medium consisting of a multi-layer film. The optical servo tracks are formed on the multi-layer film by laser heating the structure to cause a reaction or interdiffusion to occur between layers. The reaction produces a reflectivity contrast of about eight percent (8%) between exposed and unexposed areas. Other methods for preparing the servo tracks are mentioned including contact printing, embossing, and lithography.

U.S. Pat. No. 4,961,123, entitled "Magnetic Information Media Storage with Optical Servo Tracks," discloses a preferable method and apparatus for etching the pattern on a disk using a focused beam of light. The magnetic disk is placed on a platen/spindle assembly and rotated. A beam of light is focused to a small spot on the spinning disk. The focussed beam has sufficient intensity to ablate the disk surface at that spot, thereby reducing the reflectivity of the surface at that spot, and as the disk rotates, a groove is produced. The beam can be left on during an entire revolution to produce a continuous groove or can be modulated on and off through one revolution to produce a stitched pattern of non-continuous grooves.

With the preferred etching method described above, the width of the etched grooves that define each servo track is a function of the energy density, ED, delivered by the incident beam to the focused spot on the disk. The energy density, ED, delivered by the beam is proportional to the intensity of the beam, $I_o$, within the focused spot divided by the area of the spot, $A_o$, multiplied by the linear velocity $V_1$ of the disk at the focused spot. That is, $$ED \alpha \frac{I_o}{A_o V_1}$$

The linear velocity, $V_1$, of the rotating disk at the focused spot is a function of the radius, r, of the particular groove or servo track being etched. That is, $$V_1 = 2\pi r \times b,$$

where b is the "spin velocity" of the disk in revolutions-per-minute (rpm).

Typically, the groove width is on the order of microns and must be maintained within tight tolerances. For a single servo track, the energy density at the focused spot, and hence the width of the groove (or grooves w/ a stitched pattern), can be held constant simply by rotating the disk at a constant spin velocity, b. However, as the incident beam is moved radially of the disk to etch servo tracks at other radii, the change in radius results in a proportional change in the linear velocity of the disk surface at those radii. Therefore, if the disk rotates at a constant spin velocity, b, the energy density, ED, delivered to the surface of the disk will vary at different radii. Consequently, the groove width at different radii of the disk will vary significantly—an unacceptable condition.

One prior art method for compensating for the change in energy density at different track radii is to vary the rotational speed (rpm) of the disk to maintain a constant linear velocity despite the change in radius. Such a method is disclosed in the aforementioned U.S. Pat. No. 4,961,123 at column 10, lines 58-62. This method is disadvantageous, however, because etching must be suspended while the spindle motor settles to each new velocity. This prior art method results in lower throughput and requires high maintenance for the mechanical elements.

Another prior art method for compensating for the change in energy density is to vary the intensity of the incident beam at different radii by controlling the power supplied to the light source. Typically the light source is a laser. While varying the power supplied to the light source does alter the intensity of the beam, it also results in unacceptable beam wander and pointing stability.

Another possibility is to use a compensated neutral density wedge located in the path of the incident beam. Again, however, such a method results in unacceptable beam wander.

Thus, there is need for an apparatus and method of maintaining constant energy density at all radii of the disk, but which does not unacceptably reduce throughput and which does not require variation in the rotational speed of the disk. Additionally there is a need for an apparatus and method which does not produce undesirable beam wander. The present invention satisfies these needs.

SUMMARY OF THE INVENTION

In accordance with the present invention, the intensity of a beam of light used to etch concentric servo tracks on a magnetic medium is adjusted with an acousto-optical device to maintain a substantially constant energy density delivered by the beam while the optics which generate the beam move radially of the disk.

A spindle rotates the disk. Optics generate the incident beam and focus the beam to a spot on the rotating disk. The optics are moved so that the beam moves radially of the rotating disk for etching each of the concentric servo tracks.

Sets of digital intensity signals are stored in a random-access-memory for controlling the intensity of the incident beam. Sets of these digital intensity signals are selected under microprocessor control and in response to the radial position of the beam relative to the disk. These sets of signals are applied to the acousto-optical device so that the beam delivers a substantially constant energy density to the spot on the disk as the beam moves radially of the disk. Adjusting the intensity of the beam with an acousto-optical device eliminates many of the problems of the prior art. The intensity is adjusted to compensate for the change in track radius as the bean moves radially of the disk.

An encoder encodes the radial position of the beam relative to the disk. The signal produced by the encoder is applied to the memory to retrieve the stored digital intensity signals from the memory. A voice coil actuator controls the movement of the optics which generate the incident beam. A closed loop feedback control feeds back positional information to the voice coil actuator.

In accordance with another feature of the present invention, the beam is moved continuously radially of the disk. The beam of light is steered with the acousto-optical device to maintain the beam in concentrical patterns. The beam is steered in a manner which compensates for the continuous mechanical movement of the beam by the optics. As with the intensity signals, sets of digital steering signals are stored in a random access memory and are selected under microprocessor control and in response to the radial position of the beam. These sets of signals are applied to the acousto-optical device to maintain the beam in concentrical patterns.

In accordance with yet another aspect of the present invention, sets of digital pattern signals are stored in a memory for modulating the beam on and off. These sets of digital pattern signals are selected under microprocessor control and in response to the angular position of the disk. The sets of digital pattern signals are applied to the acousto-optical device for modulating the incident beam on and off to produce a stitched servo track pattern. An encoder is provided for encoding the angular position of the spindle. The signal representing angular position is applied to the memory to select the stored digital pattern signals.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings, an embodiment that is preferred, it being understood, however, that the invention is not limited to the specific methods and instrumentalities disclosed. In the drawings.

DETAILED DESCRIPTION OF THE PREFERRED EMBODIMENT

Figure 1:
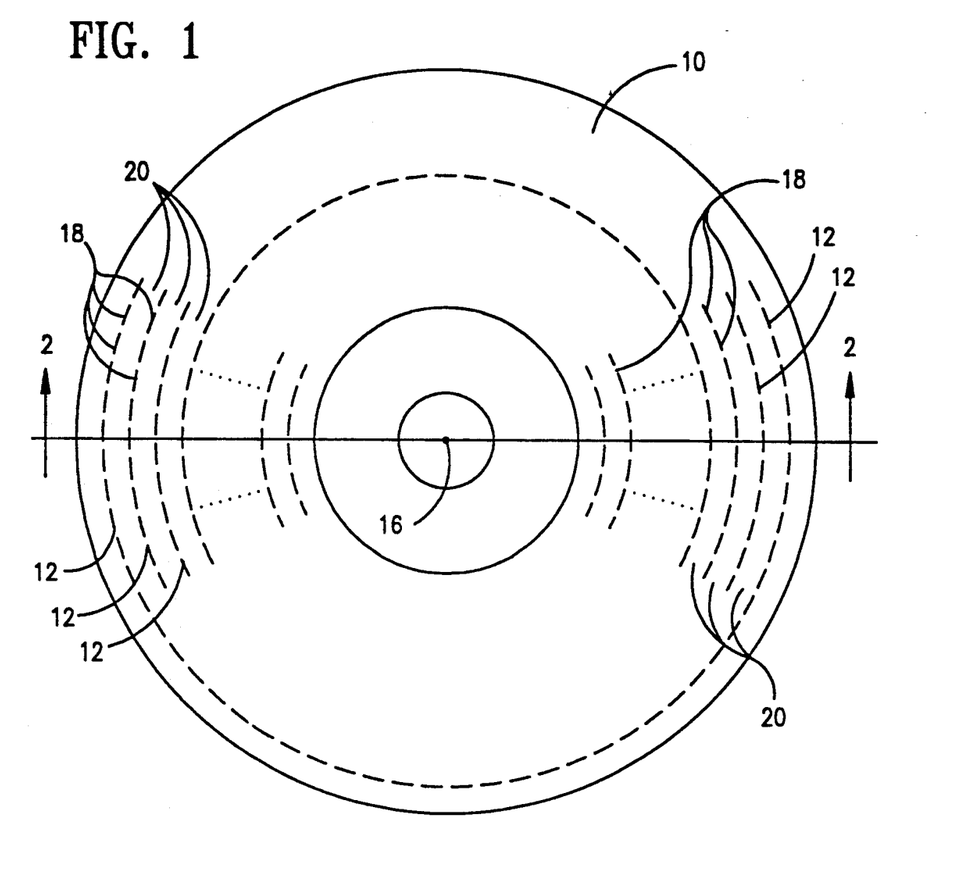
FIG. 1 is a top view of a magnetic disk having concentric magnetic data tracks and concentric optical servo tracks each comprised of a plurality of equally spaced etched stitches.

Referring to the drawings in detail, wherein like numerals indicate like elements throughout, there is shown in FIG. 1 a top view of a magnetic disk 10 having concentric optical servo tracks 12 about the rotational axis 16 of the disk 10. Each servo track 12 is comprised of a plurality of equally spaced etched stitches 18. Concentric magnetic data tracks 20 (i.e., non-etched regions) lie between each adjacent pair of servo tracks 12 for magnetically recording data on the disk 10. In the preferred embodiment, the disk 10 has 900 concentric servo tracks 12 and each servo track 12 comprises 1666 equally spaced etched stitches 18.

Figure 2:
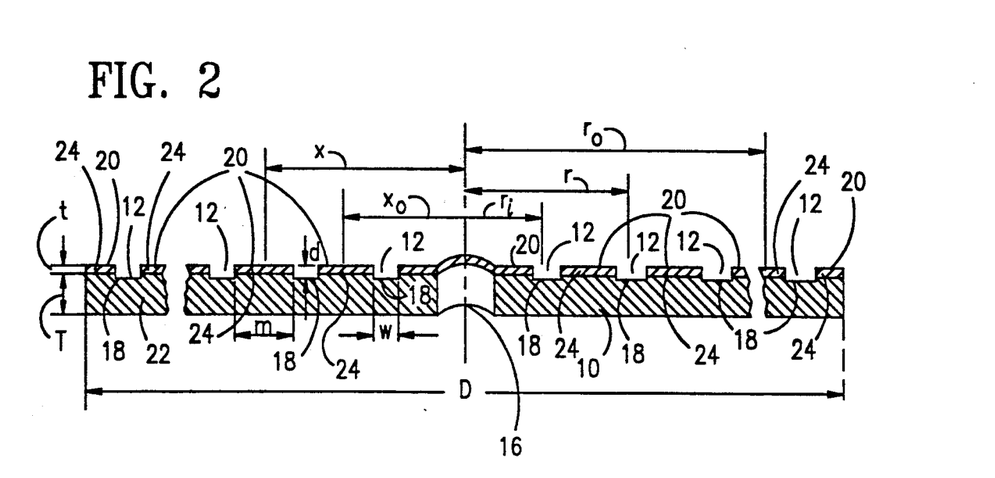
FIG. 2 is a cross-sectional view of the magnetic disk of FIG. 1 taken along line 2—2 of FIG. 1.

Referring now to FIG. 2 there is shown a cross-sectional view of the magnetic disk 10 of FIG. 1 taken along line 2—2 of FIG. 1. The disk 10 comprises a substrate 22 having a thickness T, and a magnetic coating 24 on the surface of the substrate 22. The magnetic coating 24 has a thickness t. As described more fully below, the stitches or grooves 18 are formed by etching the magnetic coating 24 with a beam of light. Once etched, the stitches 18 are indelible. Each groove or stitch 18 in each servo track 12 has a width w and a depth d. Although the stitches 18 are illustrated in FIG. 2 as having a well-defined, almost uniform depth d, they need not be so uniform. For example, each stitch may simply be a rough "scarred" region on the surface of the magnetic coating. The non-etched regions that define the magnetic data tracks 20 have a width m that represents the spacing between adjacent optical servo tracks 12.

The stitches or grooves 18 define a plurality of concentric optical servo tracks 12 each having a radius r as measured from the rotational axis 16 of the disk 10 to the center of the etched stitches 18. As shown in FIG. 2, the outer-most radius is designated $r_o$ and the inner-most radius is designated $r_i$. Similarly, the non-etched regions between adjacent servo tracks 12, which form the concentric magnetic data tracks 20, have a radius x as measured from the axis 16 of the disk 10 to the center of the data track 20.

Figure 3:
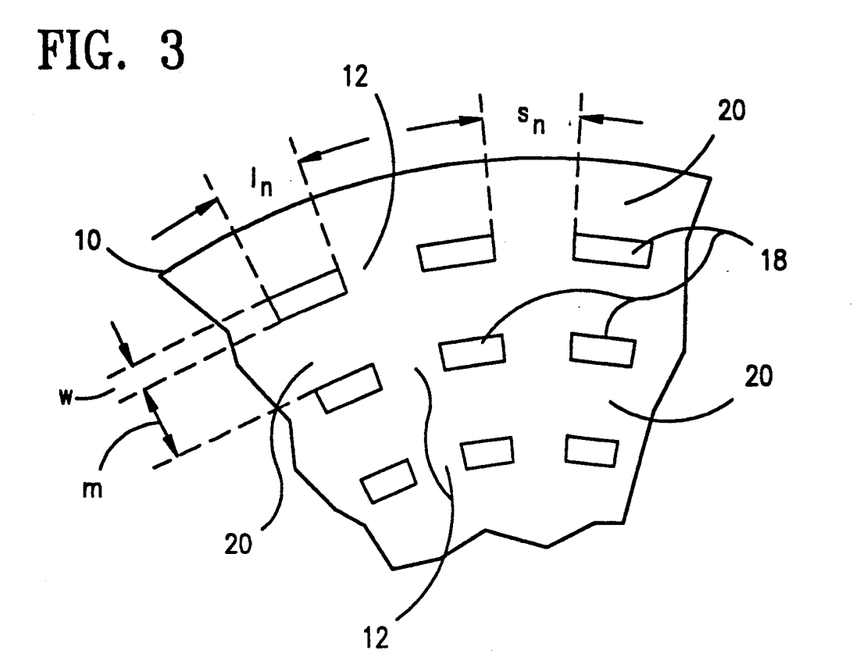
FIG. 3 is an enlarged top view of a portion of the magnetic disk of FIG. 1 showing the etched stitches in greater detail.

Referring now to FIG. 3, there is shown an enlarged top view of a portion of the magnetic disk 10 of FIG. 1. As shown in FIG. 3, the stitches 18 in each servo track 12 have a length $l_n$ and consecutive stitches in a given track 12 have a spacing $s_n$ between them. In the preferred embodiment, for each track, the length $l_n$ of each stitch and the spacing $s_n$ between consecutive stitches is equal; however, the length $l_n$ may be greater or smaller than the spacing $s_n$ between consecutive stitches.

As mentioned above, each optical servo track 12 comprises an equal number of stitches 18, which in the preferred embodiment is 1666. Because the radius r of the servo tracks 12 decreases from the outer-to inner-most track, in order to maintain the same number of stitches 18 per track, the stitch spacing $s_n$ and stitch length $l_n$ must decrease from the outer- to the inner-most track.

In the preferred embodiment, each stitch 18 has a width w of approximately 4.8 microns, and the optical servo tracks 12 are laid down every 20.4 microns on the disk.

Figure 4:
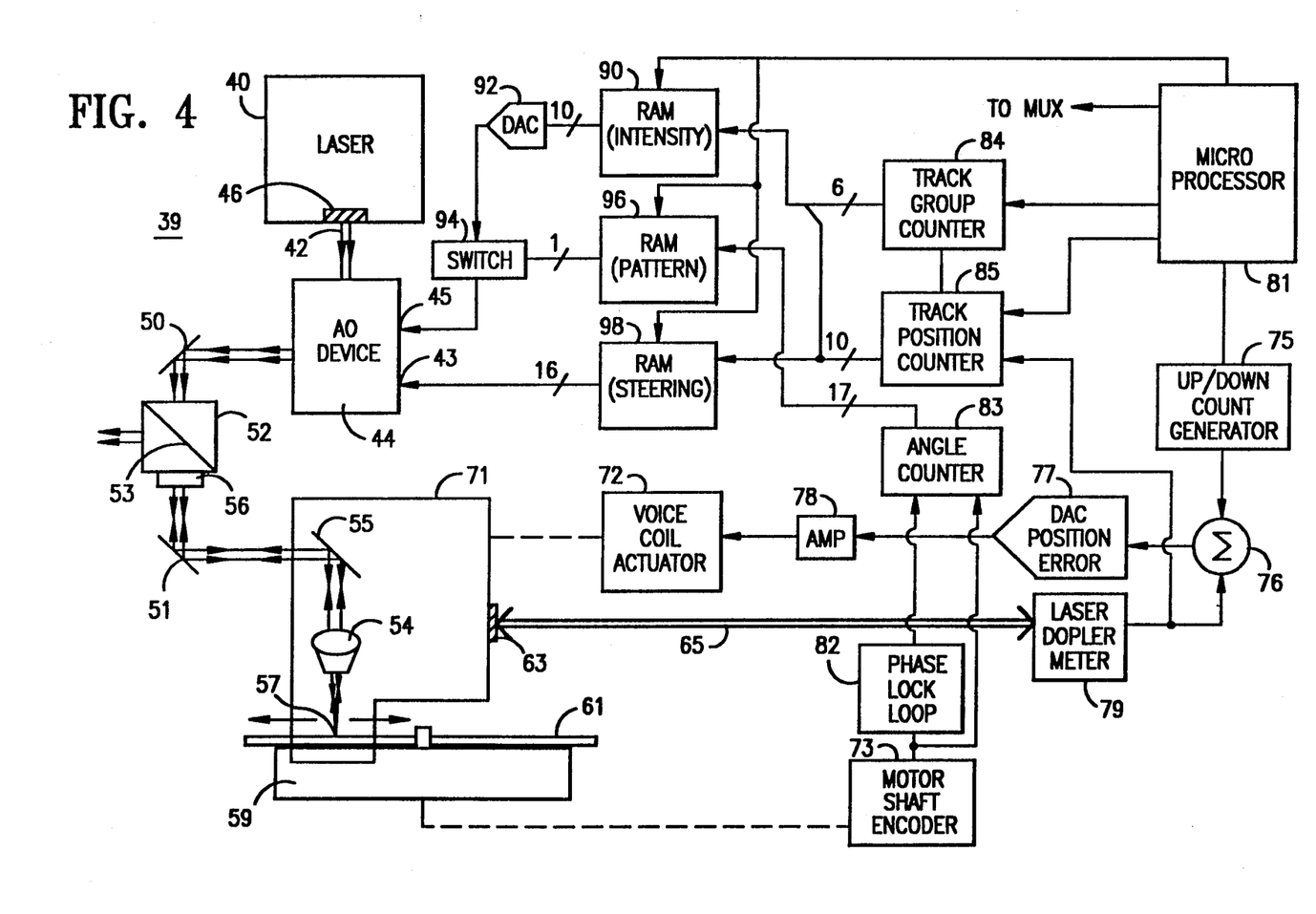
FIG. 4 is a block diagram of an apparatus for etching optical servo information on a magnetic medium and for varying the intensity of the incident beam in accordance with the present invention.

Referring to FIG. 4, there is shown a preferred embodiment of an apparatus 39 for etching the surface of a magnetic medium to reduce the reflectivity thereof and to produce concentric servo tracks. More particularly, the apparatus 39 is for etching a plurality of concentric optical servo tracks about the rotational axis of a magnetic storage disc, such as is shown in FIG. 1, wherein each track comprises a plurality of equally spaced etched stitches.

As shown in FIG. 4, the apparatus 39 comprises a light source 40 for providing an incident beam of light 42. The light source 40 has means (not shown) for linearly polarizing the incident beam of light in a first polarizing direction. The direction of linear polarization, i.e., the first polarizing direction, is not critical. In the preferred embodiment, the light source 40 is a laser tuned to a wavelength suitable for etching the surface of the magnetic medium. Thus, the incident beam is highly collimated and monochromatic. Different wavelengths may be used with magnetic media having different characteristics. Two brewster windows (not shown) in the laser tube comprise the means for linearly polarizing the incident beam.

The apparatus 39 also comprises an acousto-optical device 44 for adjusting the intensity of the incident beam and for steering the bean for reasons which will become evident hereinafter. Acousto-optical devices are described generally in Wilson & Hawkes, OPTO-ELECTRONICS: AN INTRODUCTION, pp. 111 to 116 (Prentice/Hall 1983). The Acousto-optical (AO) device 44 is described hereinafter in greater detail. Briefly, the device 44 accepts digital frequency data at a first input 43 and analog voltage data at a second input 45. The frequency data and voltage data control the frequency and amplitude, respectively, of an ultrasonic wave applied to a birefringent crystal in the device 44 which changes the index of refraction of the crystal in one direction. Changes in the frequency of the ultrasonic wave produce deflections of the incident beam as it travels through the crystal. Changes in the amplitude of the ultrasonic wave create corresponding changes in the intensity of the beam.

Mirror 50 directs the linearly polarized incident beam through a beam separator 52. Beam separator 52 has means for transmitting light linearly polarized in the first polarizing direction (as is the incident beam) and for deflecting light linearly polarized in a direction orthogonal to the first polarizing direction. In the preferred embodiment, the means for transmitting light linearly polarized in the first polarizing direction and for deflecting light polarized orthogonal thereto is a multilayer dielectric thin film laser line coating 53 positioned along the hypotenuse of the beam separator 52.

The beam separator 52 transmits the linearly polarized incident beam and mirrors 51, 55 direct the transmitted incident beam to an objective lens 54. The lens 54 focuses the incident beam to a spot 57 on a magnetic storage disk 61 to be etched. In the preferred embodiment, the focused spot 57 is substantially circular, however it need not be substantially circular; for example, the focused spot could be oblong in shape.

A platen/spindle assembly 59 rotates the disk 61 about its rotational axis. The lens 54 is positioned such that the rotating disc lies substantially in the focal plane of the lens 54. The focused incident beam reacts with the rotating magnetic medium 61 at the spot 57 to create a stitch (not shown) on the medium 61 having reduced reflectivity. A portion of the focused incident beam is reflected. Since the incident beam is focused to a fine spot on the magnetic medium, the reflected light effectively emanates from a point source. As described above, the rotating disk 61 lies in the focal plane of the lens 54, and therefore, the point source of reflected light lies at the focal point of the lens 54. Consequently, the lens 54 operates to collimate the reflected light and direct a reflected beam back toward the beam separator 52 via the mirrors 51,55. The reflected beam is used for verification as is more fully described in co-pending U.S. patent application, Ser. No. 07/896,197, entitled "Apparatus for and Method of Verifying Etching of Optical Servo Information on Magnetic Medial".

A voice coil actuator 72 moves the optics 71 which generate the beam of light so that the beam moves radially of the disk for etching each of the concentric servo tracks. In the preferred embodiment, the beam of light is moved continuously radially of the disk 61. The actuator 72 is moved by a closed loop positioning system which comprises up/down count generator 75, counter 76, digital-to-analog converter 77 and laser Doppler meter 79. To initiate movement, microprocessor 81 loads a value into the up/down count generator 75. The up/down count generator 75 produces a pulse train having a given number of pulses at a given velocity for indicating desired position. These pulses increment or decrement the counter 76 depending upon the desired direction of movement. The output of the counter 76 drives the digital-to-analog converter 77 which generates an error voltage. An amplifier 78 provides compensation and current amplification. Amplifier 78 causes current to flow in the voice coil actuator 72, causing the actuator 72 to move in the desired direction. This movement is detected by the laser Doppler meter 79, which feeds back the new position. This signal causes the counter 76 to increment or decrement back to the zero position.

As mentioned, in the preferred embodiment, the incident beam is moved continuously radially of the disk 61. Prior art methods of etching concentric servo tracks keep the incident beam still while etching a given track and only move to reposition the incident beam for etching the next track. By moving the incident beam continuously radially of the disk, the present invention increases throughput. Because the optics 71 which generate the incident beam are continuously moving radially of the disk, the acousto-optical device 44 is used to steer the incident beam in order to maintain the beam in the concentrical pattern of the track being etched.

Figure 5:
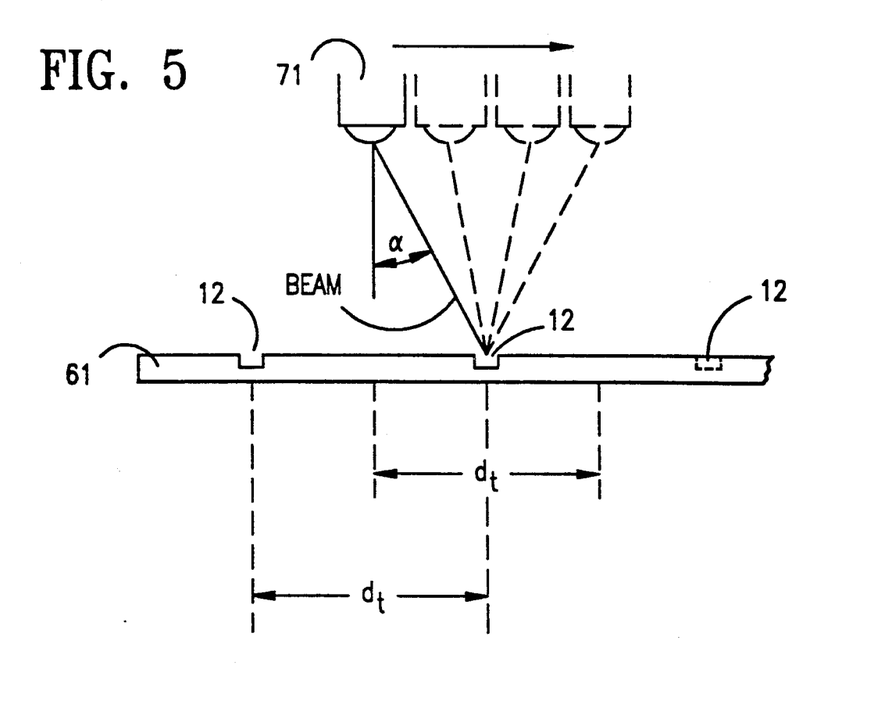
FIG. 5 is a graphical illustration of steering an incident beam in accordance with another aspect of the present invention.

Referring briefly to FIG. 5, there is shown a graphical illustration of the method of beam steering in accordance with the present invention. As illustrated, adjacent optical servo tracks 12 have a track-to-track spacing, $d_t$. As mentioned previously, in the preferred embodiment, $d_t$ is approximately 20.4 microns. Thus, the optics 71 move continuously radially (in the direction of the arrow) through a distance of 20.4 microns during the etching of each track. Consequently, the incident beam must be steered at an angle $\alpha$ in order to maintain the beam in the concentrical pattern of the track 12 being etched. As illustrated, the steering angle $\alpha$ is a function of the radial position of the optics 71 relative to the disk 61. This method of beam steering is the subject of co-pending U.S. patent application, Ser. No. 07/896,188, entitled "Steering Laser Beam While Etching Optical Servo Tracks for Magnetic Disks".

Referring once again to FIG. 4, the radial position of the optics 71 during the etching of a given servo track (i.e., an etch cycle) is encoded by the laser Doppler meter 79. A bi-directional laser beam 65 that strikes a retro-reflector 63 on the optics 71 provides positioning information to the laser Doppler meter 79. The resolution of the laser Doppler meter 79 is adjustable. In the preferred embodiment, the laser Doppler meter 79 is adjusted to discern movement of the optics 71 in increments of 1/516 of the track-to-track distance $t_d$. As the optics 71 move radially through each 1/516th increment during the etching of a track, the laser Doppler meter 79 increments a track position counter 85. The track position counter 85, therefore, maintains a count which indicates the radial position of the optics 71 during an etch cycle. The counter 85 is reset at the beginning of each etch cycle.

From the radial position information provided by the track position counter 85, the steering angle $\alpha$ can be calculated. Circuitry could be provided to continuously re-calculate the beam angle $\alpha$ and provide a proper steering signal to the acousto-optical device 44. Such circuitry, however, would be complex and difficult to implement. In accordance with the present invention, a memory-mapped technique is used.

Acousto-optical device 44, which is used to steer the beam, is controlled by sets of digital steering signals retrieved from a first random-access-memory (RAM) 98. Each digital steering signal stored in the first RAM 98 represents the beam angle $\alpha$ required for a particular radial position of the optics 71 during an etch cycle. In the preferred embodiment, there are 516 steering signals stored in the first RAM 98—one for each of the 516 positions encoded by the laser Doppler meter 79 during an etch cycle. The output of the track position counter 85 provides the memory address of the appropriate stored signal for a given radial position. The acousto-optical device 44 responds to the retrieved steering signals to steer the beam to maintain the beam in the concentrical pattern of the track being etched.

According to the present invention, the spindle 59 rotates the magnetic disk 61 at a constant speed (rpm). As mentioned in the background, however, with a constant rotational speed, the energy density, ED, delivered by the incident beam to the spot 57 on the disk 61 will vary at different track radii. This would result in unacceptable stitch width variations. Recall from the background that the energy density, ED, delivered by the beam is proportional to the intensity of the beam, $I_o$, within the focused spot 57 divided by the area of the spot 57, $A_o$, multiplied by the linear velocity $V_1$ of the disk 61 at the focused spot 57. That is, $$ED \, \alpha \, \frac{I_o}{A_o V_1}$$

In accordance with the present invention, as the optics which generate and focus the incident beam are moved radially of the disk to etch different servo tracks, the intensity $I_o$ of the incident beam is adjusted with an acousto-optical device to maintain a substantially constant energy density delivered by the incident beam at all radii. Specifically, acousto-optical device 44 is used to adjust the intensity of the beam.

The AO device 44 is controlled by sets of digital intensity signals retrieved from a second random-access-memory (RAM) 90. The sets of digital intensity signals are selected under control of microprocessor 81 and in response to the radial position of the incident beam relative to the disk 61. The digital intensity signals are converted to an analog voltage signal by a digital-to-analog converter (DAC) 92. For purposes described more fully below, the analog voltage signal passes through an analog switch 94 which performs a gating function in response to the output of a third random-access-memory (RAM) 96. The analog voltage signal then passes from switch 94 to the AO device 44. The AO device 44 is responsive to the amplitude of the analog signal from DAC 92 to adjust the intensity of the incident beam transmitted through the device 44.

The digital intensity signals are stored in a table in the second RAM 90 as a function of the radial position of the beam. In addition, beam steering angle can affect the energy density delivered by the beam and therefore can also affect stitch width. Consequently, the intensity signals are also a function of beam steering angle. The intensity signals are retrieved and applied (in the form of an analog signal) to the device 44 using a memory-mapped approach similar to that described above for the steering signals.

As mentioned above, in the preferred embodiment, there are 900 concentric servo tracks each having a unique radius $r_n$. Thus, to compensate for the different radii, potentially 900 different intensity signals could be stored in the second RAM 90—one for each track. As described previously, however, the beam is steered through 516 angles during the etching of a given track and each angle requires an intensity adjustment as well.

Because the beam is steered through the same set of angles for each track, the intensity adjustment factor based on angle will repeat for every track. However, the overall intensity value during the etching of each track must vary to compensate for the different radii. Thus, to compensate for both beam angle and track radius, 516 unique intensity signals might be stored for each of the 900 servo tracks—each signal representing an adjustment factor based on steering angle and an adjustment factor based on track radius. The cost of memory required for such a large number of signals may be prohibitive.

Consequently, in the preferred embodiment, the intensity adjustment factor based on track radius is held constant for groups of adjacent tracks. For each group, the intensity adjustment factor is averaged over the entire group and remains constant. Thus, the same 516 intensity signals are used for each track in the group and the change in radius within the group is ignored. This is acceptable because adjacent servo tracks are relatively close together (20.4 microns) and therefore have relatively similar radii. Using the same 516 intensity signals for a group of adjacent tracks does not result in unacceptable stitch width so long as the size of the group is small enough that stitch width stays within accepted tolerances.

In the preferred embodiment, there are 16 tracks to a group. Each time the track position counter 85 is reset, a track is counted by the track group counter 84. The output of the track group counter 84 and track position counter 85 are combined to form the data address for the intensity signals stored in the second RAM 90. Thus, for each group of 16 tracks, the track group counter 84 and track position counter 85 combine to address a set of 516 intensity signals for the tracks in that group. As the beam is used to etch the disk 61 from the outside to the inside of the disk 61, the overall intensity for each group is reduced as the beam moves from the outside to the inside groups of tracks. Although in the preferred embodiment the intensity of the beam is varied according to groups of servo tracks, if sufficient memory is available, the intensity may be varied on a track-to-track basis.

As mentioned, the retrieved intensity signals are fed to digital-to-analog converter 92 which produces an analog voltage signal having an amplitude which varies in proportion to the retrieved intensity signals. The analog signal is fed through switch 94 to the analog input 45 of the AO device 44. The AO device is responsive to the analog voltage signal to alter the intensity of the incident beam in proportion to the amplitude of the voltage signal. By altering the intensity of the incident beam to compensate for the change in radial position of the optics 71 relative to the disk 61 and to compensate for the change in beam angle, the present invention maintains a substantially constant energy density delivered by the beam to the disk during the entire etching of the disk.

In accordance with another feature of the present invention, the beam is modulated on and off during an etch cycle to produce the stitched pattern of the optical servo tracks. As mentioned, in the preferred embodiment, there are 1666 equally spaced stitches in every servo track. Thus, the incident beam must be modulated on and off as the disk 61 rotates past the beam in order to create the stitched etched pattern. To this end, the angular position of the spindle 59 is encoded with a motor shaft encoder 73. Motor shaft encoder 73 produces 1666 individual pulses during one revolution which indicate the angular position of the spindle 59. The output of the encoder 73 is applied to a phase lock loop 82 which multiplies the frequency digitally, but keeps the output in phase with the shaft encoder 73. In the example under consideration, the output of the phase lock loop 82 is at 64 times the frequency of the output of motor shaft encoder 73. This increases the angular resolution of the encoder to 1/64th of a stitch. The phase lock loop signal is applied to angle counter 83 which increments in response to the pulses output by the phase lock loop 82. Thus, the digital value in the angle counter 83 represents the angular position of the disk 61 during an etch cycle. The counter 83 is reset once a revolution.

The output of counter 83, which indicates the angular position of the disk 61, provides a memory address to a third random-access-memory (RAM) 96. The third RAM 96 contains sets of digital pattern signals for modulating the incident beam on and off. Specifically, the pattern signals are stored in a table in the third RAM 96 as a function of the angular position of the disk 61 during an etch cycle. The signals stored in the third RAM 96 indicate whether the incident beam should be on or off at a given angular position. The output of third RAM 96 controls the analog switch 94. Thus, at a given angular position, a pattern signal is addressed and retrieved from the third RAM 96. The retrieved signal represents either beam-ON or beam-OFF. If the retrieved signal represents beam-ON, the switch 94 is closed allowing the analog intensity signal from the DAC 92 to pass to the input 45 of the AO device 44. If however, the retrieved pattern signal represents beam-OFF, the switch 94 is opened and a one-volt signal is applied to the input 45 of the AO device 44. A one-volt signal applied to the input 45 of the device 44 effectively turns the beam off. In this manner, the on-off duty cycle of the beam is controlled to obtain the desired stitch pattern for each servo track.

As mentioned above, in the preferred embodiment, the length of each stitch $l_n$ and the spacing $s_n$ between consecutive stitches in each track is equal—a 50% duty cycle. As mentioned, however, the phase lock loop 82 and angle counter 83 provide an angular resolution of approximately 1/64 of a stitch. Thus, by altering the pattern of signals in third RAM 96, the stitch pattern is highly customizable.

The memory-mapped approach to controlling the steering, intensity and on-off pattern of the incident beam achieves great flexibility and allows the apparatus 39 to be easily adapted for different etched servo track patterns and disk sizes. Microprocessor 81 and other logic (not shown) provide overall control of memory addressing and timing functions.

Figure 6:
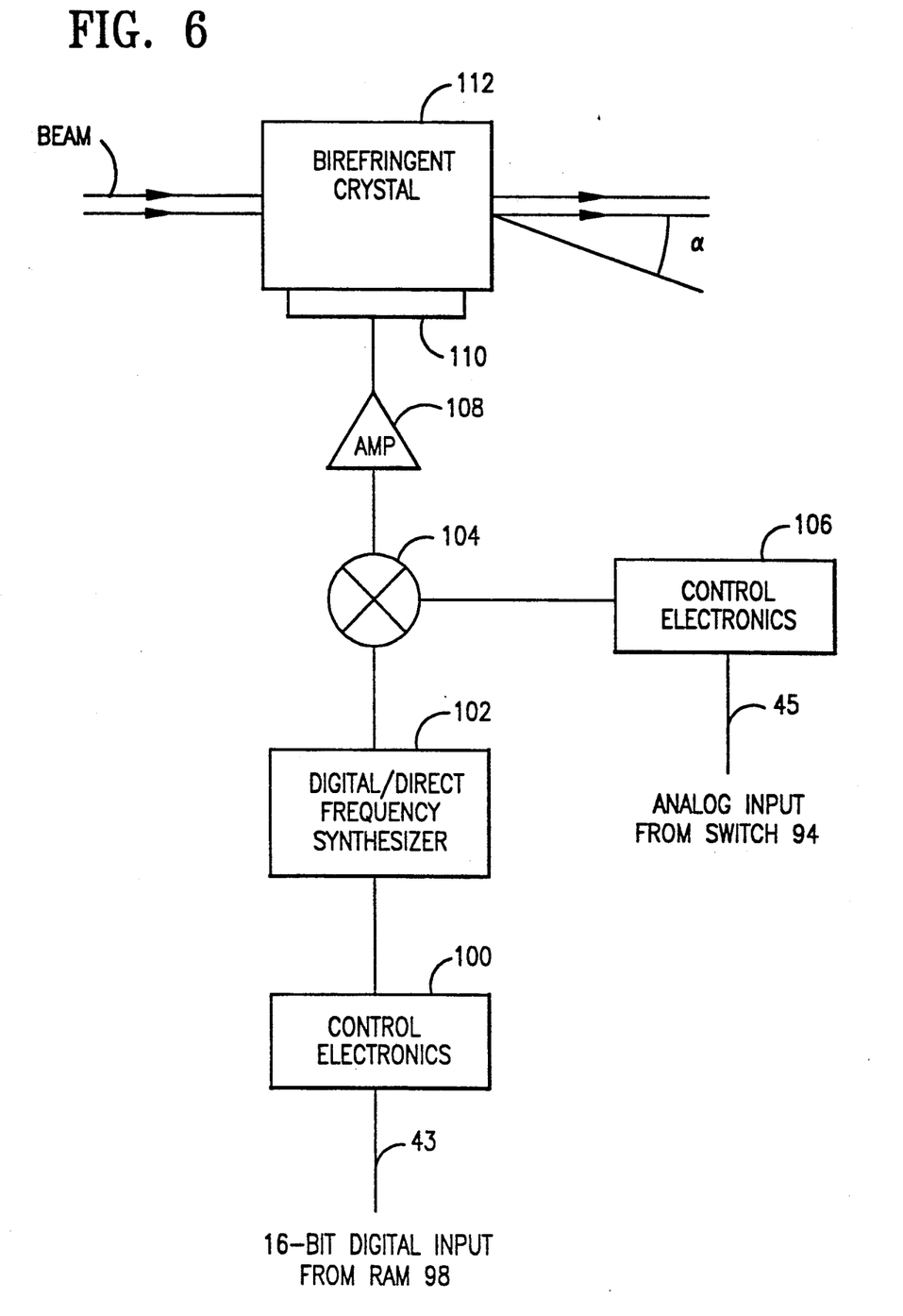
FIG. 6 is a block diagram showing further details of the acousto-optical device of FIG. 4 in accordance with the present invention.

Referring now to FIG. 6, the acousto-optical device 44 of FIG. 4 is shown in greater detail. The device 44 accepts the 16-bit digital signals retrieved from RAM 98 (FIG. 4) at a first input 43. The device 44 accepts the analog voltage signal from switch 94 (FIG. 4) at a second input 45. The 16-bit digital signals (i.e., words) are received by control electronics 100 and fed to a digital/direct frequency synthesizer 102. The frequency synthesizer 102 produces a fixed amplitude oscillating signal having a frequency which varies in response to, and proportional to, the digital values of the 16-bit signals from the RAM 98 (FIG. 4). The oscillating signal is fed to modulator/mixer circuit 104.

The analog voltage signal is received by control electronics 106 which condition the signal and pass the signal to the modulator 104. The amplitude of the analog voltage varies from 0 to 1 volts. The modulator/mixer 104 amplitude modulates the oscillating signal from the synthesizer 102 with the analog voltage signal. The output of modulator/mixer 104 is fed to amplifier 108 which amplifies the signal and feeds it to a transducer 110 which is coupled to a birefringent crystal 112. The transducer 110 produces an ultrasonic wave having the same frequency/amplitude characteristics as the electronic signal from the modulator/mixer 104. The ultrasonic wave is applied to the birefringent crystal 112. The incident beam is directed through the crystal 112. The ultrasonic wave changes the index of refraction of the crystal in one direction. The frequency of the ultrasonic wave controls deflection or steering of the incident beam as it travels through the crystal, while the amplitude of the ultrasonic wave controls the intensity of the beam that exits from the crystal.

Thus, as described above, the 16-bit digital signals from RAM 98 (FIG. 4) control the steering angle of the incident beam as it passes through the device 44. The analog signal generated by the digital-to-analog converter 92 in response to the digital signals retrieved from RAM 90 controls the intensity of the incident beam.

The device 44 was manufactured by Neos Corp., Melbourne, Fla. Typically, acousto-optical devices use a voltage controlled oscillator (VCO) to control the frequency of the signal fed to the transducer 110. In accordance with the present invention, however, the typically employed VCO was replaced with the digital/direct frequency synthesizer 102. The synthesizer 102 achieves a much higher frequency stability, and therefore beam steering stability, over time and temperature. Such enhanced frequency/steering stability is necessary to achieve the tight stitch width and placement tolerances required in accordance with the present invention.

It will be appreciated by those skilled in the art that changes could be made to the embodiment described above without departing from the broad inventive concepts thereof. It is understood, therefore, that this invention is not limited to the particular embodiment disclosed, but is intended to cover all modifications which are within the scope and spirit of the invention as defined by the appended claims.

What is claimed is:

1. A method of etching a plurality of concentric optical servo tracks about the rotational axis of a magnetic storage disk in relation to magnetic tracks on said disk comprising:
   rotating said disk on a spindle;
   generating an incident beam of light and focusing said beam to a spot on said rotating disk;
   moving the optics which generate and focus said beam of light so that said beam moves radially of said rotating disk for etching each of said concentric servo tracks; and
   adjusting the intensity of said incident beam with an acousto-optical device as said beam moves radially of said disk to maintain a substantially constant energy density delivered by said beam at said spot.

2. The method recited in claim 1 wherein said disk is rotated at a constant angular velocity.

3. Method recited in claim 1 wherein the step of adjusting the intensity of said incident beam comprises the steps of:
   storing sets of digital intensity signals for controlling the intensity of said incident beam;
   selecting said sets of digital intensity signals under microprocessor control and in response to the radial position of said beam relative to said disk; and
   applying said sets of digital intensity signals to said acousto-optical device to maintain a substantially constant energy density delivered by said beam as said beam moves radially of said disk.

4. The method recited in claim 3 further comprising the steps of:
   encoding the radial position of the beam relative to the disk to produce a signal representing the radial position of said beam; and
   applying said signal representing radial position to select the stored digital intensity signals.

5. The method recited in claim 1 wherein the step of moving the optics comprises:
   moving said optics with a voice coil actuator; and
   feeding back positional information in closed loop control of said voice coil actuator.

6. The method recited in claim 1 wherein the optics are moved continuously radially of the disk and further comprising the step of:
   steering said beam of light with said acousto-optical device to maintain said beam in concentrical patterns to etch said concentric optical servo tracks.

7. The method recited in claim 6 wherein the step of steering comprises:
   storing sets of digital steering signals for controlling said steering;
   selecting said sets of digital steering signals under microprocessor control and in response to the radial position of said beam; and
   applying said sets of digital steering signals to said acousto-optical device to maintain said beam in concentrical patterns.

8. The method recited in claim 7 further comprising:
   encoding the radial position of the optics relative to the disk to produce a signal representing the radial position of the optics; and
   applying said signal representing radial position to select the stored digital steering signals.

9. The method recited in claim 1 further comprising:
   storing sets of digital pattern signals for modulating the incident beam on and off;
   selecting said sets of digital pattern signals under microprocessor control and in response to the angular position of the disk; and
   applying said sets of digital pattern signals to said acousto-optical device for modulating the incident beam on and off to produce a stitched servo track pattern.

10. The method recited in claim 9 further comprising:
    encoding the angular position of said spindle with a motor shaft encoder to produce a signal representing the angular position of said spindle; and
    applying said signal representing angular position to select the stored digital pattern signals.

* * * * *